United States Patent [19]

Liebscher et al.

[11] 4,073,023
[45] Feb. 14, 1978

[54] METHOD OF MANUFACTURE OF FOOTWEAR

[75] Inventors: Anton Liebscher, Waynesville; Sven Oberg, Lake Junaluska; Kenneth Smathers; Horace Auberry, both of Waynesville, all of N.C.

[73] Assignee: Ro-Search, Inc., Waynesville, N.C.

[21] Appl. No.: 734,879

[22] Filed: Oct. 22, 1976

Related U.S. Application Data

[62] Division of Ser. No. 493,965, Aug. 1, 1974, Pat. No. 4,003,145.

[51] Int. Cl.² .............................................. A43D 21/00
[52] U.S. Cl. .................................. 12/142 RS; 12/145
[58] Field of Search ........... 12/142 R, 142 RS, 142 E, 12/142 EV, 145; 36/4, 7.3, 17 R, 17 PW, 32 R, 14

[56] References Cited

U.S. PATENT DOCUMENTS

| 3,365,821 | 1/1968 | Cottier ....................................... 36/4 |
| 3,742,544 | 7/1973 | Auberry et al. ................. 12/142 RS |
| 3,758,903 | 9/1973 | Auberry et al. ................. 12/142 RS |
| 3,965,517 | 6/1976 | Auberry et al. ................. 12/142 RS |
| 4,003,145 | 1/1977 | Liebscher et al. ............... 36/17 PW |

Primary Examiner—Patrick D. Lawson
Attorney, Agent, or Firm—Dos T. Hatfield

[57] ABSTRACT

Improvements in the safety and comfort of footwear having the appearance of having very thick soles and improvements in the method of their manufacture.

1 Claim, 7 Drawing Figures

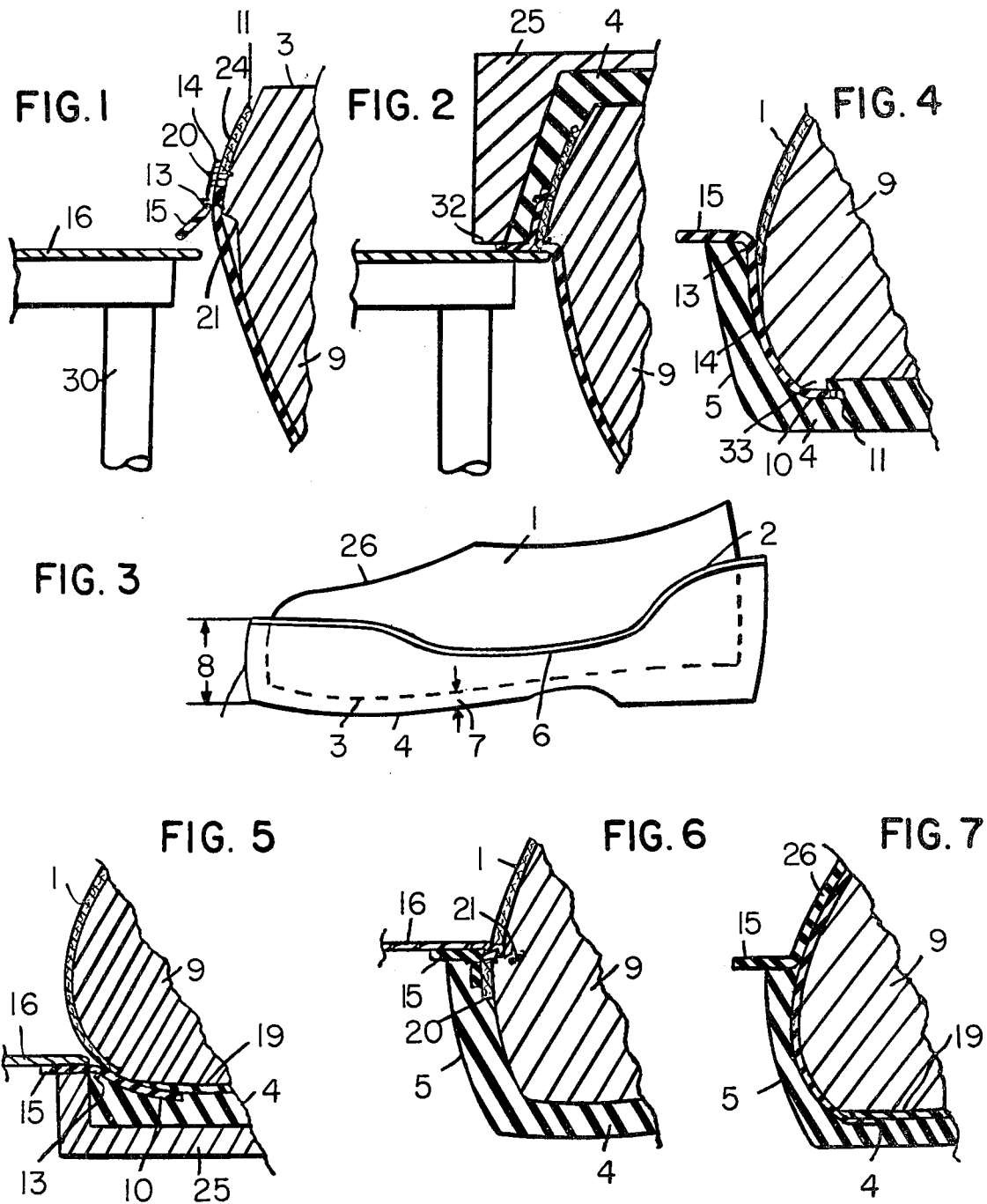

METHOD OF MANUFACTURE OF FOOTWEAR

This is a division of application Ser. No. 493,965 filed Aug. 1, 1974 now U.S. Pat. No. 4003,145.

PRIOR ART

It is old in the art to stitch an elastomeric welt to the lasting margin of an upper of leather, or similar material, and to mold a sole comprising elastomeric material to the shoe bottom so that the welt forming the upper level of the visible shoe sole edge is on the level of the insole of the footwear. The substantial increase in the sole thickness, as it is presently fashionable in shoes of such construction, results in an uncomfortable shoe which is dangerous to the wearer because of the stilt effect of such a shoe.

BRIEF DESCRIPTION OF THE DRAWING

FIG. 1 is a sectional view of a portion of the footwear on a mold last prior to the attaching of the sole;

FIG. 2 shows the same view after molding of the sole;

FIG. 3 shows in a side view the finished footwear;

FIGS. 4, 5, 6 and 7 show sectional views of other executions of the invention.

DESCRIPTION OF THE PREFERRED EMBODIMENT

According to the invention, the elastomeric sole 4 is extended at least on part of its periphery upwardly, as shown at 5 in FIG. 3, to present an apparent sole height 8 at a multiple of the sole thickness 7 under the insole level 3. The apparent sole height might vary, i.e. be greater at the toe and/or heel area, and lower at the shank area 6. Correspondingly, more or less of the upper 1 remains visible.

At the upper edge 2 of the sole extension 5 a sealing welt, located correspondingly spaced from the insole level 3, is secured to the material of the upper 1, usually leather. The welt comprises an outward extension 15 and a portion 14 extending along the upper 1. The material of the welt is preferably elastomeric material compatible with the elastomer of the sole 4. The portion 14 is secured to the upper by a stitching 13 or other means such as heat sealing, etc.

In the manufacture of the footwear, the upper with the welt spaced from the lasting margin 10 is mounted on the mold last 9 of a sole device which includes a sole molding cavity 25. In a loading station of such soling device, the upper is lasted by a lasting string 11 secured to the edge of the lasting margin 10, or by fastening the lasting margin 10 after tightening to an insole 19, or any other of the various lasting methods. As shown in FIG. 1, the lasting string 11 is preferably located on the mold last side between the feather edge and the widest part of the last. This results in savings in material and a reduction in the shirring of the lasting margin. FIG. 1 shows the replacement of upper material between the welt 15 and the lasting margin 10 by a strip 24 secured by a stitching 20 to the lower or inside portion 14 of the welt. Less expensive material than the visible upper material 1 might be used for the strip 24.

As shown in FIG. 4, the portion 14 of the welt might be extended downwardly to form the lasting margin 10 and to carry the lasting string 11. When less lasting stresses are needed, the pre-welted upper might be held on the mold last 9 by a welt plate 16, as shown in FIG. 6. When full lasting is required, the strip 24 might be extended, as shown in FIG. 7, to include not only a lasting margin 10, but also a portion carrying the vamp 26. Elastomeric sheet stock, integrally pervious or made pervious by perforations, is preferred because of its light weight and its strength to take lasting stresses and provide resiliency and strength to the upper if bonded to even very soft leather of thinner gauge.

After the mounting and lasting of the pre-welted upper 1 on the mold last 9, the invention provides for the use of a flat welt plate 16 to bring the outward extending welt 15 from the position shown in FIG. 1 into the position of FIG. 2. The welt plate, usually divided lengthwise, is carried by supports 30 in a preselected spacial relation to the mold last 9, so that the correct position of the welt 15 can easily be checked by the operator in the loading station. The absence of a cavity side frame and/or cavity bottom assures ease of flattening the welt, as well as inspection. Thereafter, the unit of mold last, with welt plate and its locating and locking supports 30, is moved into juxtaposition with the sole molding cavity 25. In closing the mold cavity the edge of the welt portion 15 is clamped between the lip plate 16 and the edge 32 of the mold cavity, independent of the lasting means and spaced from the insole level. Substantial clamping pressure can be exerted to assure that even very easily flowable elastomers, such as urethanes, will not run to the outside of the cavity or welt. The lip plate 16 is also used to force the material of the upper 1 around the deformation 21 of the mold last 9, such as shown in FIG. 1, or a groove as shown in FIG. 6. In either case, the deformation of the material of the upper around an edge assures satisfactory sealing of the upper to the last to prevent the running of elastomer upwardly beyond the sealing deformation.

After the molding of the sole 4, either by pouring, injection, or other molding, the footwear is removed from the soling device and the previously clamped edge of the welt 15 trimmed to the sole circumference. The trimming after de-molding can be very close to the upper, giving a nearly weltless appearance, without danger of elastomer flowing to the outside of the welt.

What is claimed is:

1. The method of manufacture of footwear with molded soles, comprising the steps of securing an outward extending welt to the upper spaced substantially above the insole level, securing string lasting means to said upper above the insole level, string lasting said upper on the mold last of a sole molding device in its loading station, positioning and maintaining the outward extending welt in its final position by means of a welt plate while removed from the sole molding device, inspecting the shoe bottom and locking said welt plate in position relative to said mold last, moving the unit of last, welt plate, and locking means into juxtaposition with the sole molding device, clamping the edge of the outward extending welt between said welt plate and the edge of the sole molding device, while preventing the inwardly protruding edge of said welt plate from exerting horizontal pressure upon the upper and thereby preventing damage to said upper, and molding a sole to said welt.

* * * * *